Figure 1:
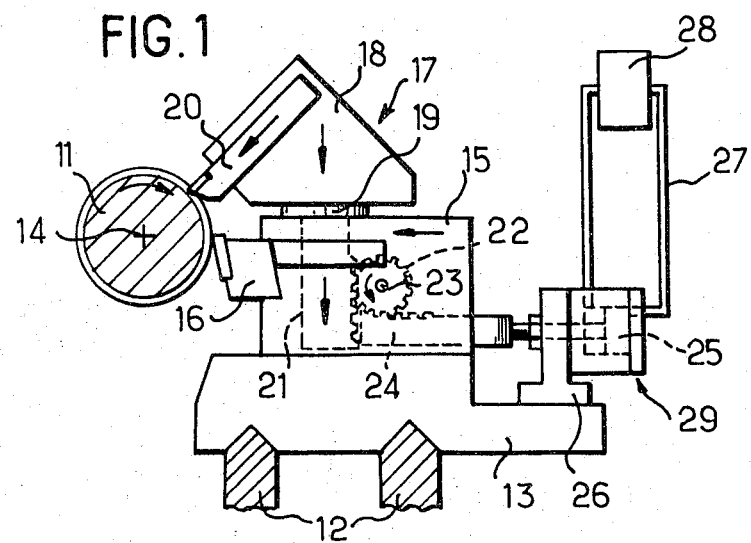

United States Patent
Nann

[11] 3,871,252
[45] Mar. 18, 1975

[54] SCREW THREAD CUTTING MACHINE

[75] Inventor: Erwin S. Nann, Esslingen, Germany

[73] Assignee: Cri-Dan, Paris, France

[22] Filed: Aug. 10, 1973

[21] Appl. No.: 387,275

[30] Foreign Application Priority Data
Aug. 12, 1972 Germany............................ 2239856

[52] U.S. Cl. ......................................... 82/25, 82/5
[51] Int. Cl. .......................................... B23b 21/00
[58] Field of Search ................................... 82/5, 25

[56] References Cited
UNITED STATES PATENTS

| | | | |
|---|---|---|---|
| 595,288 | 12/1897 | Cheney et al. ........................... | 82/25 |
| 782,220 | 2/1905 | Coulter et al. ............................ | 82/5 |
| 2,238,019 | 4/1941 | Floeter .................................... | 82/25 |

*Primary Examiner*—Leonidas Vlachos
*Attorney, Agent, or Firm*—Lane, Aitken, Dunner & Ziems

[57] ABSTRACT

A screw cutting machine has two holders for cutting tools. The first holder is mounted on the cross-slide of a conventional compound slide. The second tool holder is carried by a support which is mounted on the cross-slide for movement in a direction normal to the direction of movements of the two slides which constitute the compound slide. The second tool holder holds a tool at a selected angle, e.g., 45°, to the tool carried by the first holder and in an appropriate attitude for working on the workpiece. The support and cross-slide are interconnected via the longitudinal slide of the compound slide so that as the cross-slide advances the first and second tool holders stepwise (horizontally) for successive passes over the workpiece, the support and second tool holder are also moved downward by a distance related to the horizontal distance moved by the cross-slide. The second tool holder thus makes a greater advance than the first tool holder at each step, and advantage can be taken of this by mounting rough-cut and finishing-cut tools in the first and second tool holders respectively to enable the rough-cut tool to make the first cuts and to enable the finishing-cut tool to overtake the rough-cut tool in time to make the final finishing cuts on the workpiece. A known device may be incorporated for diminishing the transverse feed as the formation of the screw thread proceeds. A motor may be provided for withdrawing the second tool-holder at a selected stage, and in this case the finishing-cut tool can be mounted in the first tool holder.

11 Claims, 2 Drawing Figures

PATENTED MAR 18 1975　　3,871,252

SCREW THREAD CUTTING MACHINE

This invention relates to screw-thread cutting machines of the kind in which a cutting tool cuts the screw-thread in a plurality of passes effected by longitudinal displacement of a longitudinal slide with accompanying stepwise advance of the tool by means of a cross-slide on which the holder for the cutting tool is mounted.

On known machines of this kind, the cutting of the screw-thread is carried out with a single-point cutting tool by making one cut after another, the profiled cutting tip of the tool corresponding to that of the finished screw-thread. The profiled cutting tip removes all the material that requires to be removed in a fairly large number of passes, and then carries out the finishing cut in the last pass. Not only are close tolerances on diameter required in this finishing cut, but also good surface quality and accuracy of shape of the screw-thread. The sensitive tip of the cutting tool must be capable of meeting these requirements as to accuracy, but all the material has to be previously removed using the same cutting edge. The preparation and regrinding of a profiled cutting tool is very difficult and time-consuming.

The object of the invention is to provide a screw-thread cutting machine of the initially stated kind in which the edge life of the accurately profiled cutting tool is prolonged and the cost of producing and regrinding the tools can be kept low.

According to the invention there is provided a screw-thread cutting machine comprising a frame in which a workpiece can be mounted for rotation about an axis, a fixed first guide means on the frame, a longitudinal slide mounted on the first guide means for guided movement in a first direction parallel to said axis, a cross-slide mounted on the longitudinal slide for guided movement relative thereto in a second direction normal with respect to said axis, a first tool holder mounted on the cross-slide, a second tool holder mounted on the cross-slide and movable relative to the cross-slide in a third direction normal to said first and second directions, and means for so moving the second tool holder in dependence on the movement of the cross-slide relative to the longitudinal slide, the second tool holder being adapted to support a cutting tool at an angle to a cutting tool carried by the first tool holder.

Thus, when the cross-slide is advanced towards the workpiece, the second tool holder is moved in the direction transverse of this movement and of the movement of the longitudinal slide, i.e., in the vertical (preferably downward) direction when the normal longitudinal and cross-slide arrangement is used. At the same time however the second tool holder participates in the advance movement of the cross-slide so that overall, i.e., considered in relation to the workpiece, it moves towards the latter at an angle but at a higher speed of advance than that of the cross-slide. The operations that can be carried out with this arrangement and the resulting advantages will be described in detail hereinafter.

There is preferably provided an operating mechanism connected to the second tool holder to move the second tool holder in said third direction independently of the movement of the cross-slide. This operating device, which preferably includes a hydraulic motor, enables the second tool holder, when carrying a rough-machining tool, to be moved out of the cutting zone so that the finish-machining tool fitted in the cross-slide can move into engagement with the workpiece.

The ratio of the movements of the second tool holder and the cross-slide in said third and second directions respectively is 1:1. Thus the second tool holder is advanced each time on the cross-slide by the same amount as the cross-slide itself is advanced towards the workpiece. Thus, the movement of the cutting tool, clamped in the second tool holder, preferably at an angle of 45° to the cutting tool in the cross-slide, proceeds at an angle of 45° and at a speed 1.414 times ($\sqrt{2}$) the speed of advance of the cross-slide. In accordance with one advantageous feature of the invention, the drive may consist of at least one pinion which co-operates with two racks. In this arrangement one of the racks is preferably connected to the second tool holder and the other to the longitudinal slide or the frame of the machine, and the pinion is mounted on the cross-slide for rotation. Thus during the forward movement of the cross-slide the pinion rolls along the rack secured to the machine and in so doing downwardly displaces the rack associated with the support. Thus the preferred drive consisting of a pinion and racks is a particularly simple one that economizes in space. However other drives, for example a lever or cam drive system, could be used for accomplishing a corresponding transmission of movement.

In this arrangement it is also possible, with advantage, for the rack associated with the longitudinal slide or the frame of the machine to be longitudinally displaceable by the operating mechanism. This longitudinal movement enables the cutting tool fitted in the second tool holder to be readily moved away from the workpiece when changing from rough-machining to finish-machining.

It will be seen that the equipment in accordance with the invention can be of particularly simple design and that it enables, in an advantageous manner, the coarse work to be carried out with a rough-machining tool, the finish-machining tool being used only for a smoothing operation. A particular advantage is that existing screw-thread cutting machines to not need to be redesigned or rebuilt; instead, in many cases it suffices to mount a suitably designed cross-slide on the existing longitudinal slide of a standard machine of this kind. Numerous modifications can be made to the system. Although the above-mentioned transmission ratio of 1:1 and the angle of 45° between the two cutting tools offer particular advantages, other ratios and/or angles are possible. The various transmission ratios can be obtained for example by replacing the single pinion by two coaxially disposed pinions having different numbers of teeth. However, care must be taken to move the second tool holder or the tool clamped therein along the axis of the workpiece during the entire machining operation so that the optimum position of the tool in relation to the workpiece is maintained.

Figure 2:
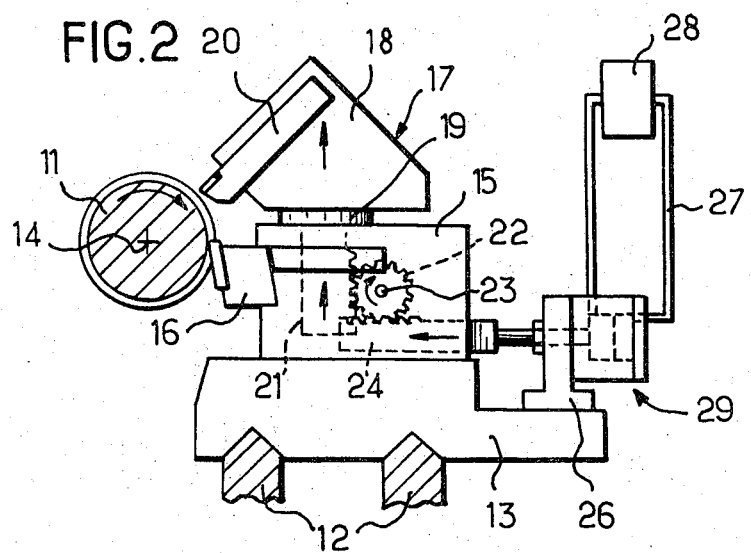

One embodiment of the invention will now be described by way of example with reference to the accompanying drawings in which:

FIG. 1 is a diagrammatic illustration of part of a screw-thread cutting machine in accordance with the invention, viewed in the direction of the axis of the workpiece, and FIG. 2 is a similar view showing the parts in another working position.

A workpiece 11 is clamped in the screw-thread cutting machine, illustrated only in part in the drawings, and can be rotated under power. The frame of the screw-thread cutting machine has two parallel guides 12 on which a longitudinal slide 13 can be displaced parallel to the axis 14 of the workpiece 11. A cross-slide 15 is mounted on the longitudinal slide 13 on guides, not illustrated, and can be moved thereon towards and away from the workpiece in the horizontal direction. In a holder the cross-slide carries a cutting tool 16 which is clamped in such manner that it moves into cutting engagement with the workpiece at a point level with the axis of the workpiece. The longitudinal slide can be reciprocated in the longitudinal direction and the cross-slide can be advanced towards the workpiece by control means which, for the sake of clarity, are not shown in the drawing. Also provided is a device which allows the tool 16 to engage the workpiece only when the longitudinal slide 13 is moving in one particular direction, the edge of the tool being withdrawn from cutting engagement during the return movement of the longitudinal slide.

Arranged above the cross-slide is a support 17 which comprises a head 18, forming a tool holder, and a column 19 which is movable in guides (not illustrated) in the cross-slide 15. A cutting tool 20 is clamped in the head 18 at an angle of 45° to the horizontal and operates on the workpiece 11 at a point which, in the direction in which the cut is made, is 45° in advance of the cutting position of the tool 16.

Secured to the support 17 is a rack 21 which engages with a pinion 22 mounted to rotate freely on a shaft on the cross-slide 15. The pinion 22 in turn engages a substantially horizontally disposed rack 24 which projects into the cross-slide but is displaceably connected thereto. That end of the rack 24 which projects from the cross-slide 15 is connected to the rod of a hydraulic motor piston 25 which moves in a hydraulic motor cylinder 26 mounted on the longitudinal slide 13. It is convenient to mount the hydraulic motor on the longitudinal slide since the motor has to participate in the movements of the longitudinal slide and would therefore otherwise need to be mounted on a separate guide moving with the longitudinal slide. The hydraulic cylinder is supplied with fluid from control apparatus 28 by way of pipes 25 connected to opposite ends of the cylinder.

The following modes of operation are possible with the screw-thread cutting machine of the invention:

In a first mode of operation, the cutting tool 16 in the cross-slide 15 is a rough-machining tool and the cutting tool 20 in the support 17 is the finish-machining tool. In this case, the tools are so set that the rough-machining tool first comes into operation, and the finish-machining tool trails behind the rough-machining tool to an extent such that the finish-machining tool, which makes longer advance steps, "overtake" the rough-machining tool after a predetermined number of cutting passes, and then performs the finishing cut during the remaining passes. Here it is possible to set the machine in known manner to give a diminishing feed, i.e., the advance of the cross-slide can be carried out in shorter steps towards the end of the machining operation. This can be advantageous if it is not desirable for larger chips to be removed during the finishing cut than in the preceding cuts.

During the advance of the cross-slide 15, which moves step-by-step to the left as viewed in the drawing, the pinion 22 rolls along the rack 24 and in so doing rotates in the counter-clockwise direction. In this way the rack 21 is moved downwards and carries the support 17 with it. Thus, at each step, the support 17 moves relative to the frame of the machine and to the workpiece horizontally towards the workpiece through a distance equal to one advance unit (on account of the advance of the cross-slide) and equal to one advance unit transversely of this direction of movement, i.e., in the downward direction in the case of the present construction. The resultant movement is thus directed to the left and downwardly at an angle of 45° towards the workpiece 11 and amounts to 1.414 times ($\sqrt{2}$) the advance of the cross-slide 15.

In the above-described mode of operation it is not necessary to actuate the hydraulic motor, and the rack 24 could therefore also be mounted on the longitudinal slide without the need for providing the hydraulic operating mechanism between the rack and the longitudinal slide.

The hydraulic operating mechanism is however important to a further mode of operation rendered possible by the illustrated apparatus. When the cutting tool 16 in the cross-slide is used for finish-machining and a rough-machining tool 20 is clamped in the support 17, the tools are so set that first the rough-machining tool (cutting tool 20) comes into operation. The finish-machining tool originally set to the diameter of the rough workpiece 11 trails behind the rough-machining tool in the support 17, since the latter executes the longer advance steps. Upon completion of rough-machining, for example when approximately 80 percent of the metal to be removed has been cut away, the operating mechanism 29, which in the present example comprises the hydraulic piston 25 and cylinder 26, is actuated. For this purpose, an impulse is sent to the control equipment 28 from the machine control system, for example from a drum cam which controls the machining, and the effect of this impulse is to displace the hydraulic piston 25 to the left in the cylinder 26. The corresponding movement of the rack 24 causes the pinion 22 to rotate in a clockwise direction so that the rack 21 and support 17 are moved upwards. This movement of support 17 causes the cutting edge of the tool 20 (the rough-machining tool) to be moved upwards out of cutting engagement with the workpiece 11 as indicated in FIG. 2 by arrows. After a few advance steps have been made the cutting tool 16, profiled to carry out the finish-machining, reaches the workpiece and then carries out the finish-machining work. In this mode of operation it is advantageous for the larger chips to be removed by the more robust and less expensive rough-machining tool rather than by the finish-machining tool. It is also of advantage to arrange the finish-machining tool in the cross-slide where it is guided with more precision than it would be in the support 17.

It will be seen that the finish-machining tool, which is more expensive and more difficult to produce and re-grind, is to a larger extent not exposed to wear and damage in these two advantageous modes of operation of the machine. Its edge life can therefore be a multiple of that previously achieved, the main work being performed by a simple rough-machining tool the shape of which need only approximate to the precise profile of the screw-thread. It should be noted however that the edge life of the rough-machining tool is also greater than that of the single tool used in the known machines, so that considerably more workpieces can be machined between tool-changes.

Upon completion of machining the support 17 can be moved downwards again into the rough-machining position illustrated in FIG. 1 by returning the rack 24 by means of the operating mechanism 29.

I claim:

1. In a screw-thread cutting machine, comprising a frame in which a workpiece can be mounted for rotation about an axis, a fixed first guide means on the frame, a longitudinal slide mounted on the first guide means for guided movement in a first direction parallel to said axis, a cross-slide mounted on the longitudinal slide for guided movement relative thereto in a second direction normal with respect to said axis, a first tool holder mounted on the cross-slide, a second tool holder mounted on the cross-slide and movable relative to the cross-slide in a third direction normal to said first and second directions, and means for automatically moving the second tool holder in said third direction in response to movement of the cross-slide relative to the longitudinal slide, the second tool holder being adapted to support a cutting tool at an angle to a cutting tool carried by the first tool holder.

2. In a screw-thread cutting machine according to claim 1, further comprising an operating mechanism connected to the second tool holder to move the second tool holder in said third direction independently of the movement of the cross-slide.

3. In a screw-thread cutting machine according to claim 2, wherein the operating mechanism includes a hydraulic motor.

4. In a screw-thread cutting machine according to claim 1, wherein the second tool holder is disposed above the cross-slide.

5. In a screw-thread cutting machine according to claim 1, wherein the ratio of the movements of the second tool holder and the cross-slide in said third and second directions respectively is 1:1.

6. In a screw-thread cutting machine according to claim 5, wherein the relative positions of the first and second tool holders is such that the angle between cutting tools carried thereby is 45°.

7. In a screw-thread cutting machine according to claim 1, wherein said means for moving the second tool holder in dependence on the movement of the cross-slide relative to the longitudinal slide comprises at least one pinion and two racks meshing therewith.

8. In a screw-thread cutting machine according to claim 7, wherein one of the racks is connected to the second tool holder and the other rack is connected to the longitudinal slide, the pinion being mounted on the cross-slide for rotation.

9. In a screw-thread cutting machine according to claim 8, further comprising a motor coupled to the rack which is connected to the longitudinal slide, for moving said rack lengthwise of itself.

10. In a screw-thread cutting machine according to claim 7, wherein one of the racks is connected to the second tool holder and the other rack is connected to the frame of the machine, the pinion being mounted on the cross-slide for rotation.

11. In a screw-thread cutting machine according to claim 10 further comprising a motor coupled to the rack which is connected to the frame of the machine, for moving said rack lengthwise of itself.

* * * * *